US011088877B1

(12) United States Patent
Farshchian et al.

(10) Patent No.: US 11,088,877 B1
(45) Date of Patent: Aug. 10, 2021

(54) METHOD TO ESTIMATE MULTI-PERIODIC SIGNALS AND DETECT THEIR FEATURES IN INTERFERENCE

(71) Applicant: BAE SYSTEMS Information and Electronic Systems Integration Inc., Nashua, NH (US)

(72) Inventors: Masoud Farshchian, Englewood Cliffs, NJ (US); William H. Alexander, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/865,639

(22) Filed: May 4, 2020

(51) Int. Cl.
*H04L 27/06* (2006.01)
*H04L 25/02* (2006.01)
*H04L 27/00* (2006.01)
*H04L 25/03* (2006.01)
*H04L 27/20* (2006.01)

(52) U.S. Cl.
CPC ........ *H04L 25/025* (2013.01); *H04L 25/0252* (2013.01); *H04L 25/03171* (2013.01); *H04L 25/03993* (2013.01); *H04L 27/0012* (2013.01); *H04L 27/2035* (2013.01)

(58) Field of Classification Search
CPC ............. H04L 25/025; H04L 25/03171; H04L 25/03993; H04L 25/0252; H04L 27/0012; H04L 27/2035
USPC .......................................................... 375/340
See application file for complete search history.

(56) References Cited

U.S. PATENT DOCUMENTS

| | | | | |
|---|---|---|---|---|
| 2011/0085612 | A1* | 4/2011 | Muraoka | H04L 27/0006 375/260 |
| 2013/0336425 | A1* | 12/2013 | Lee | H04L 27/0006 375/303 |
| 2017/0094527 | A1* | 3/2017 | Shattil | H04W 12/122 |
| 2018/0123633 | A1* | 5/2018 | Gravely | H04B 1/1027 |
| 2018/0145824 | A1* | 5/2018 | Carroll | H04L 9/001 |
| 2020/0184997 | A1* | 6/2020 | Lawson | G10L 15/16 |

OTHER PUBLICATIONS

Ivan Selesnick(Total Variation Denoising (an MM algorithm)), Sep. 10, 2012 Last edit: Jan. 23, 2017 : http://eeweb.poly.edu/iselesni/lecture_notes/TVDmm/.*
Ivan Selesnick(Total Variation Denoising via the Moreau Envelope), IEEE Signal Processing Letters (Preprint), p. 1-7, arXiv:1701.00439v1 [math.OC] Jan. 2, 2017.*

(Continued)

*Primary Examiner* — Helene E Tayong
(74) *Attorney, Agent, or Firm* — Maine Cernota & Rardin; Scott J. Asmus

(57) ABSTRACT

Techniques, systems, architectures, and methods for providing improved feature detection of signals, especially those in relatively high interference regions, thereby allowing for earlier and longer range detection of communications and radar signals are herein provided. The techniques utilize a general framework of total variation denoising, where signals are assumed to be sparse in a combination of their first or higher order derivatives, to increase signal-to-interference ratio, which is followed by cyclostationarity detection, which is used to estimate signal features, including the period of the signals of interest and their modulation type.

20 Claims, 12 Drawing Sheets

(56) References Cited

OTHER PUBLICATIONS

Bach, Francis, et al. "Structured sparsity through convex optimization." Statistical Science 27.4 (2012): 450-468.
Selesnick, Ivan W., and Ilker Bayram. "Sparse signal estimation by maximally sparse convex optimization." IEEE Transactions on Signal Processing 62.5 (2014): 1078-1092.
E. J. Candes, M. B. Wakin, and S. P. Boyd, "Enhancing sparsity by reweighted L1 minimization," J. Fourier Anal. Appl., vol. 14, No. 5-6, pp. 877-905, Dec. 2008.
Afonso, Manya V., José M. Bioucas-Dias, and Mário AT Figueiredo. "An augmented Lagrangian approach to the constrained optimization formulation of imaging inverse problems." IEEE Transactions on Image Processing 20.3 (2011): 681-695.
Figueiredo, Mário AT, José M. Bioucas-Dias, and Robert D. Nowak. "Majorization-minimization algorithms for wavelet-based image restoration." IEEE Transactions on Image processing 16.12 (2007): 2980-2991.
Dr. Farshchian, Masoud. "A new TDOA estimator using joint-optimization and non-convex group sparse penalty functions." 13 Pages.
T. F. Chan, S. Osher, and J. Shen. The digital TV Filter and nonlinear denoising. IEEE Trans. Image Process., 10 (2):231-241, Feb. 2001.
Combettes, Patrick L., and Jean-Chrisophe Pesquet. "Proximal splitting methods in signal processing." Fixed-point algorithms for inverse problems in science and engineering. Springer, New York, NY, 2011. 185-212.
Pace, Phillip E. Detecting and classifying low probability of intercept radar. Artech House, 2009.
Gardner, William A. "An introduction to cyclostationary signals." Cyclostationarity in communications and signal processing (1994): 1-90.
Dr. Farshchian, Masoud and Alexander, William. "A method to estimate multi-periodic signals and detect their features in interference." 2019. 10 Pages.
Office Action for U.S. Appl. No. 16/894,285, dated Apr. 8, 2021, 13 Pages.
Tektronix, "Fundamentals of Radar Measurements", no date, www.tektronix.com/radar, pp. 1-52.

* cited by examiner

| | Cyclostationary | | | TVD with Cyclostationary | | |
|---|---|---|---|---|---|---|
| Es/No | Threshold Pfa < 0.05 | Threshold Pd > 0.99 | Distance | Threshold Pfa < 0.05 | Threshold Pd > 0.99 | Distance |
| -5 | 3.3 | 2.8404 | -0.45967 | 6.6792 | 5.1018 | -1.5774 |
| -4 | 3.3224 | 2.7953 | -0.52709 | 6.6462 | 4.9695 | -1.6767 |
| -3 | 3.3033 | 2.8076 | -0.49573 | 6.447 | 4.9008 | -1.5462 |
| -2 | 3.3343 | 2.8618 | -0.47252 | 6.5006 | 5.0998 | -1.4009 |
| -1 | 3.2828 | 2.8124 | -0.47036 | 6.8256 | 4.9743 | -1.8513 |
| 0 | 3.2725 | 2.8289 | -0.44357 | 6.5135 | 5.2351 | -1.2784 |
| 1 | 3.2365 | 2.8449 | -0.3916 | 6.4613 | 6.3604 | -0.10096 |
| 2 | 3.3003 | 2.8609 | -0.43934 | 6.6119 | 8.2751 | 1.6632 |
| 3 | 3.2693 | 3.5318 | 0.26251 | 6.7018 | 10.9193 | 4.2175 |
| 4 | 3.3377 | 4.479 | 1.1413 | 6.4826 | 13.77 | 7.2874 |
| 5 | 3.3037 | 5.3989 | 2.0951 | 6.4417 | 16.6289 | 10.1872 |
| 6 | 3.3759 | 6.423 | 3.0471 | 6.4383 | 19.2919 | 12.8537 |
| 7 | 3.3227 | 7.6275 | 4.3048 | 6.5015 | 24.6481 | 18.1466 |
| 8 | 3.3686 | 9.1705 | 5.802 | 6.5749 | 29.1086 | 22.5337 |
| 9 | 3.2916 | 11.3265 | 8.0349 | 6.4962 | 33.87 | 27.3738 |
| 10 | 3.3332 | 12.9064 | 9.5732 | 6.4569 | 38.3717 | 31.9148 |

Figure 12

METHOD TO ESTIMATE MULTI-PERIODIC SIGNALS AND DETECT THEIR FEATURES IN INTERFERENCE

FIELD OF THE DISCLOSURE

The following disclosure relates generally to signal processing and, more specifically, to feature detection in single and multi-periodic signals, especially in low signal-to-noise ratio environments.

BACKGROUND

Reliable detection of features of single and multi-periodic signals in low signal-to-noise ratio regions, especially in a timely manner, is a difficult problem.

What is needed, therefore, are methods and apparatuses that provide improved feature detection in relatively high interference regions, thereby allowing for earlier and longer range detection of communications and radar signals.

SUMMARY

Combining existing cyclostationarity (cyclostationarity and cyclostationary are used interchangeably herein) detection (CSD) techniques with the use of a non-linear filtering Generalized Total Variation Denoising (GTVD) approach, as an input, as described herein, allows for improvements in the performance of cyclostationarity detectors, allowing for identification of telecommunications and other types of signal at longer distances and/or over shorter durations.

GTVD, as used herein, may be considered an offshoot of Generalized Total Variation (GTV), which involves the use of a penalty function that can be used for estimating from noise, filling in missing data, and smoothing. Here, the specific application is denoising and so the technique is referred to as GTVD. The form of the GTV optimization and its solution, as described herein, however, is unique and improves on prior approaches, when applied to denoi sing.

In embodiments, combining existing cyclostationarity CSD techniques with the use of a non-linear filtering GTVD approach, as an input, involves acquiring a signal (e.g. radar, communication, ultra-sound, LIDAR, optical, biomedical, etc.) that may have the property that it has a single or multiple periods (i.e. is cylostationary). The waveform (i.e. the signal), in embodiments, is then processed using a sparsity-based estimator where the generalized total variation optimization to reconstruct the waveform in interference (e.g. noise, colored noise, other signals) is applied. The output of the previous step is then fed into a feature detector, in embodiments a cyclostationarity detector, in embodiments of second or higher order, to characterize and classify the waveform, including its periodicity.

By combining existing cyclostationarity detection techniques with the use of a non-linear filtering GTVD optimization approach, the cylostationary features of a signal are obtained in a shorter time in an interference environment, given the same interference level. Also, for the same time interval, the cylostationary features of the signals are obtained at lower signal to interference ratios using the techniques described herein.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 12 shows results from simulations at various Es/No for traditional cylostationarity detectors compared to embodiments of the present disclosure.

Figure 1:
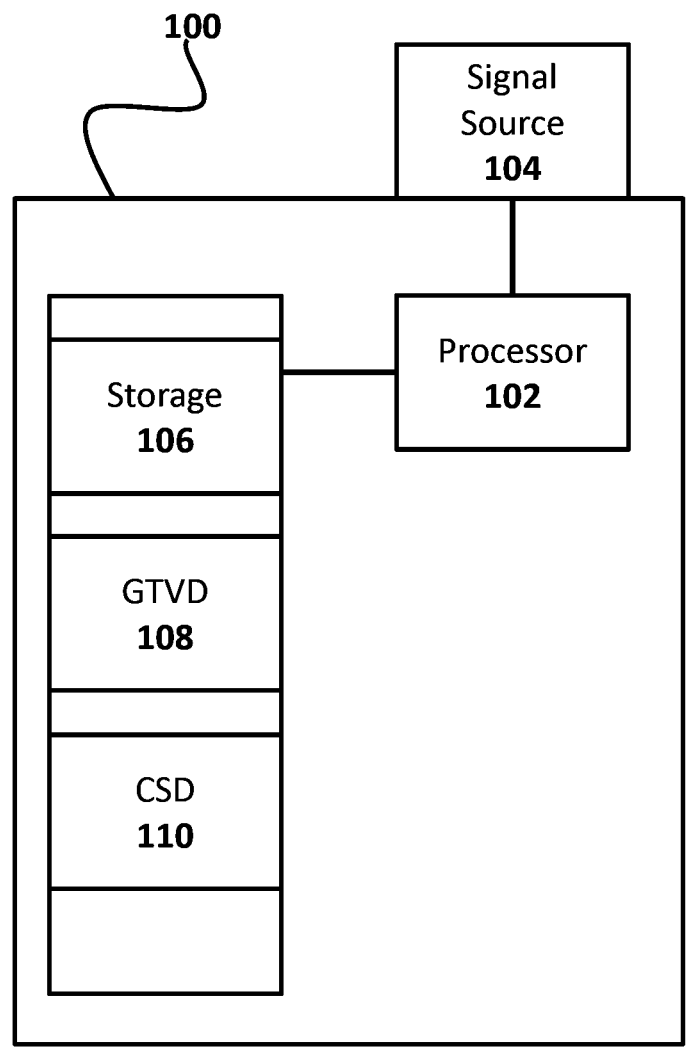
FIG. 1 is a diagram depicting a feature detection apparatus in accordance with embodiments of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

A variety of acronyms are used herein to describe both the subject of the present disclosure and background therefore. A brief listing of such acronyms along with their meaning, for the purposes of the present disclosure, is provided below:

| | |
|---|---|
| AWGN - | Additive White Gaussian Noise - a basic noise model used in information theory to mimic the effect of many random processes that occur in nature. The modifiers denote specific characteristics: Additive, because it is added to any noise that might be intrinsic to an information system; |

| | |
|---|---|
| | White refers to the idea that it is uniform across all frequency bands. It is an analogy to the color white, which has uniform emissions at all frequencies in the visible spectrum; and<br>Gaussian because it has a normal distribution in the time domain with an average time domain value of zero. |
| BPSK - | Binary Phase Shift Keying, a two phase modulation scheme, where the 0's and 1's in a binary message are represented by two different phase states in the carrier signal. |
| CS Signals - | Cylostationary Signals - A class of random signals whose statistical properties change periodically with time and are generated by some periodic mechanism. |
| CSD - | Cyclostationarity Detector - A bi-linear function that, when applied to CS signals, can provide signal characteristics such as periodicity, frequency and other features. CSD is known and described in the following references, which are herein incorporated by reference, in their entirety, for all purposes:<br>Gardner, William A. Cyclostationarity in communications and signal processing. STATISTICAL SIGNAL PROCESSING INC YOUNTVILLE CA, 1994;<br>and<br>Kim, Kyouwoong, et al. "Cyclostationarity approaches to signal detection and classification in cognitive radio." 2007 2nd IEEE International Symposium on New Frontiers in Dynamic Spectrum Access Networks. IEEE, 2007. |
| CPS - | Cyclic Power Spectrum - A linear power density function that is a function of frequency and indexed by the cyclic frequency. |
| Es - | Mean Symbol Energy. |
| Generalized TVD - | Generalized Total Variation Denoising - A Signal Processing optimization technique that penalizes variation of the signal, its derivatives, or combinations thereof in regard to noise to estimate the noise. |
| I/Q Data | The real (I) and imaginary (Q) samples of the constellation for the modulation type used. Used for modulation of data on a carrier wave, especially simultaneous encoding (modulation) of different data streams onto a carrier signal and later separation (demodulation) of those signals. |
| LPI | Low Probability of Intercept - Refers to waveforms and radars that employ measures to avoid detection by passive radar detection equipment (such as a radar warning receiver (RWR) or electronic support receiver) while it is searching for a target or engaged in target tracking, necessitating the use of advanced signal processing techniques for detection. |
| MAP - | Maximum a Posteriori - an estimate of an unknown quantity that equals the mode of the posterior distribution. |
| No - | Noise. |
| $P_d$ - | Probability of Detection. |
| $P_{fa}$ - | Probability of False Alarm. |
| ROC - | Receiver Operating Characteristic Curve - a graphical plot that illustrates the diagnostic ability of a binary classifier system as its discrimination threshold is varied. |
| SNR - | Signal to Noise Ration or the Ratio of a signal to background noise. |
| SOI - | Signal of Interest. |
| TVD - | Total Variation Denoising - A Signal Processing optimization technique that penalizes the variation of the signal in combination with its first derivative coefficients, which are assumed to be sparse, to estimate the signal. |

Furthermore, for the purposes of the present disclosure, a cylostationary process is one that arises from periodic phenomena that gives rise to random data whose statistical characteristics vary periodically with time. For example, in telecommunications, telemetry, radar, and sonar applications, periodicity is due to modulation, sampling, multiplexing, and coding operations. In mechanics it is due, for example, to gear rotation. In radio astronomy, periodicity results from revolution and rotation of planets and on pulsation of stars. In econometrics, it is due to seasonality. Finally, in atmospheric science it is due to the rotation and revolution of the earth. Such processes may also be referred to as periodically correlated processes.

Now referring specifically to FIG. 1, an embodiment of the present disclosure is depicted. This embodiment shows a feature detection system 100 comprising a signal source 104 connected to a processor 102 that is in communication with a non-transitory storage medium 106 that contains instructions configured to cause the processor to operate a general total variation denoising (GTVD) module and 108 and a cyclostationarity detection (CSD) module 110.

In one example the signal source 104 comes from a receiver coupled to an antenna that receives various incoming RF signals. The receiver, in one example, has various receiver components such as filters, mixers, amplifiers and also an analog-to-digital converter to convert analog signals to digital signals. After a digitization process, the receive signal, in embodiments, comprises complex in-band and quadrature band (I/Q) complex signals. Other methods to obtain complex I/Q signals, including direct conversion receive (DCR), where the RF signal is directly converted to (I/Q) samples, are also used, in embodiments. In still other embodiments, the receiver obtains complex I/Q signals.

The processor can be one or more processors coupled to a memory or non-transitory storage medium 106 that contains various software routines configured to carry out the methods and techniques described herein. In one exemplary embodiment, the digital signals from the signal source 104 are processed through the GTVD, which denoises the signals, thereby enhancing the signal-to-interference ratio for the feature estimation of the signal of interest.

Figure 2:
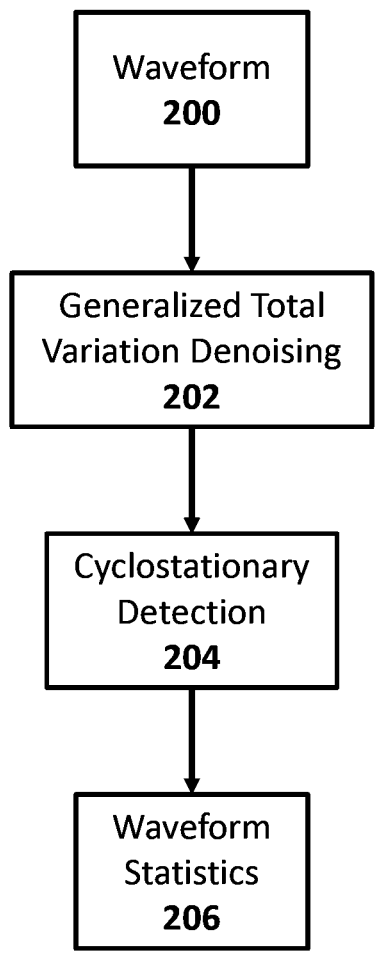
FIG. 2 is a flowchart describing a method of feature detection in accordance with embodiments of the present disclosure.

FIG. 2 discloses a method of estimating multi-periodic signals and detecting their features, in accordance with embodiments of the present disclosure. More specifically, FIG. 2 discloses obtaining a waveform 200 that comprises complex I/Q signals; subjecting the waveform to a Generalized Total Variation Denoising (GTVD) analysis 202, thereby enhancing its signal-to-noise ratio; running the results of the previous step through a Cyclostationarity Detector (CSD) 204; and outputting waveform statistics 206, which may also herein be referred to as features, in embodiments peak values, locations of peaks and troughs, periodicity or lack thereof, and other signal features used for detection and classification of the waveform (i.e. the signal).

More specifically, to determine features of a data source "x" from a received signal "y" (e.g. its cycles, its modulation type, etc.), in accordance with embodiments of the present disclosure, we start with an optimization pre-step process that minimizes the following cost function among all possible values of vector x.

$$(\hat{x}) = \underset{x}{\mathrm{argmin}}(\theta(y, x) + \varphi(y, x)) \qquad \text{Equation (1)}$$

In Equation 1, above, θ is a data-fidelity term and φ is a regularization function.

Cost functions, which may also be referred to as optimization cost functions, such as that shown in Equation 1, may be formulated in terms of analysis or synthesis regularization terms or a mixture thereof. Exemplary embodiments described herein are meant to describe specific, exemplary cases of the formulation of optimization costs functions and the choice of analysis or synthesis terms or a combination thereof and are not meant to be limiting.

Alternatively, an optimization cost function may be formulated from a Bayesian estimation theory perspective and estimate the desired signal (e.g. through a Maximum a Posteriori (MAP) estimate). Such alternative formulations of the cost function and corresponding solutions may be derived by those skilled in the art based on the example embodiments of the optimization cost function formulation presented herein, which are intended to be exemplary and non-limiting.

The regularization function, in embodiments, may be defined as a combination of regularization functions with different regularization parameter weights. The regularization function is used to penalize undesirable characteristics of the signal. The regularization functions may be any one of $l_1$ norm or $l_0$ norm, nuclear norm, other sparsity promoting functions including the $l_1$ norm, non-convex penalties, group sparse functions, total variation, mixed norms, Huber loss functions, sparsity in a transform domain such as wavelets and Fourier domain, sparsity using prior knowledge such as clutter maps, structure in time-frequency transforms, etc. The regularization functions may further be determined depending on the signals being separated.

Now regarding the Generalized Total variation Denoising (GTVD) 202 that is discussed herein, as used herein, GTVD 202 should be understood to refer to an optimization-based, non-linear filtering method that is well-suited for the estimation of signals that are sparsified with respect to some filters corrupted by additive white Gaussian noise and an example of a cost function, such as that shown in Equation 1. As a non-limiting example, the generalized total variation denoising (GTVD) of a signal x consisting of N samples is corrupted by Additive White Gaussian Noise (AWGN) n to give y=n+x, is defined by the optimization problem:

$$GTVD_{\lambda,N}\{y\} = \underset{x}{\operatorname{argmin}}\left\{\frac{1}{2}\|(y-x)\|_2^2 + \sum_{i=0}^{N} \lambda_i \varphi_i(D_i^{\alpha_i} x_i)\right\} \quad \text{Equation (2)}$$

In an optimization problem such as that shown in equation 2, the optimization problem does not usually have a closed-form solution and must be solved iteratively. Here: $\varphi$ are regularization functions; $\alpha_i$ are integers (although they can be defined as fractions); $D_i$ are operators, which may be linear filters represented in matrix form; and $\lambda_i$ are regularization parameters.

A particular, non-limiting example form of Equation (2) is written below for the total variation denoising problem:

$$TVD_\lambda\{y\} = \underset{x}{\operatorname{argmin}}\left\{\frac{1}{2}\|(y-x)\|_2^2 + \lambda\|D^\alpha x\|_1\right\} \quad \text{Equation (3)}$$

In equation 3, a is a real number and D is a difference matrix. For $\alpha=1$, D is the $(N-1)\times N$ difference matrix where the first row is [-1 1 zeros(1,N-2)]. $D^2$ is similarly defined as a $(N-2)\times N$ matrix with the first row [-1 2 -1 zeros(1, N-3)]. Each additional row is then shifted by one zero to the right, relative to the previous row. The rows of the difference matrix, D, can be written as any filter, including a notch filter, as a particular frequency band.

Overall, the GTVD function of embodiments is composed of two parts, the first part being a least square data-fidelity term and the second part being a regularization function that penalizes the total variation of the signal with respect to a combination of derivatives of the signals. Since the L1 norm is convex, we obtain a solution to the optimization problem for all regularization values $\lambda>0$. Example algorithms to solve Equations (2) and (3) can be found in the publication "Proximal splitting methods in signal processing" and would be known to one of ordinary skill in the art (Combettes, Patrick L., and Jean-Christophe Pesquet. "Proximal splitting methods in signal processing." Fixed-point algorithms for inverse problems in science and engineering. Springer, New York, N.Y., 2011. 185-212).

Integration of the solution of Equation (3) with a cyclostationarity detector (CSD) shows a significant improvement in detection of signal features.

Next, we derive and present a particular example of estimating the desired signal in noise in the GTVD framework proposed herein where we assume the I/Q signal received is a digital signal and that y=x+n, where x is the desired multi-periodic signal and n is white Gaussian noise.

The assumption for our optimization is that the signal is sparse in its first and second derivative. This should be understood to describe a single pulse, periodic train of pulses, or multiple periodic signal with a rise-time that is a function of linear or/and quadratic time samples, followed by a constant envelope, followed by a fall-time that is a function of a linear and quadratic time.

Figure 4:
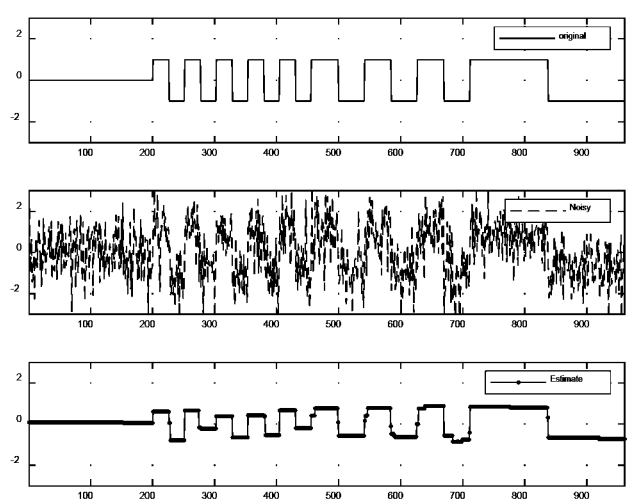
FIG. 4 is a sample waveform with two periods (top), random noise added to the waveform (middle), and a denoised waveform obtained using a GTVD approach (bottom), in accordance with embodiments of the present disclosure.

An example of such a signal is shown in FIG. 4, although other examples of similar signals would be known to those knowledgeable in the arts. To estimate x in this GTVD framework, we formulate the following optimization function:

$$\underset{x}{\operatorname{argmin}}\left\{F(x) = \frac{1}{2}\|(y-x)\|_2^2 + \lambda_1\|D^1 x\|_1 + \lambda_2\|D^2 x\|_1\right\} \quad \text{Equation (4)}$$

Here y is the noisy signal, x is the desired estimated signal, D and $D^2$ are defined above, and $\lambda_1$ and $\lambda_2$ are regularization parameters that penalize the amount of first-order and second-order derivative sparsity. The regularization parameters are obtained, in embodiments, through training and cross-validation tests of actual signals relative to their corrupted noisy versions for various interference, noise, and signal-power ratios.

Figure 3:
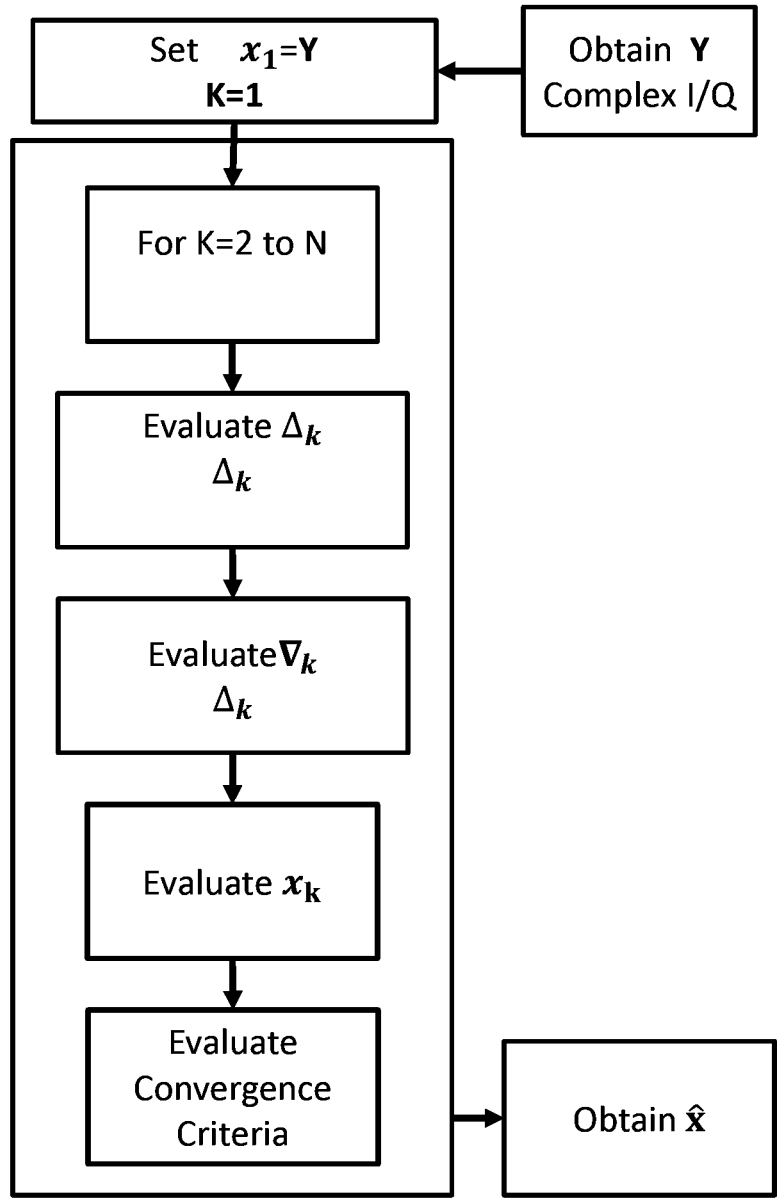
FIG. 3 is a flowchart describing an iterative solution of the estimate of x, the signal of interested, denoted by X which is embedded in y, the complex I/Q signal which also contains complex valued noise and interference, in accordance with embodiments of the present disclosure.

An iterative solution of the estimate of x, denoted by $\hat{x}$, which was obtained through Majorization Minimization, a classical optimization technique, is described below and drawn in FIG. 3 (see attached) (see Figueiredo, Mario A T, et al. "On total variation denoising: A new majorization-minimization algorithm and an experimental comparison with wavelet denoising." 2006 *International Conference on Image Processing*. IEEE, 2006.).

Each estimate of x at each iteration k, is denoted by $x_k$.

First a noisy I/Q sampled data from the A/D is obtained and denoted by y; y is assumed to consist of y=x+n, where n denotes noise and x is the multi-periodic signal of interest. This y is the sampled waveform described in FIG. 2 (200).

The MM approach consists of finding a convex Majorizer $G_k(x)$ for F(x) such that:

$$Gk(x) \geq F(x) \text{ for all possible values of } x \quad \text{Equation (5)}$$

and that it agrees with F(x) for each iteration loop, $$Gk(x_k) \geq F(x_k) \quad \text{Equation (6)}$$

In each iteration of the loop of the iterative optimization, the solution of:

$$x_k = \underset{x}{\arg\min}\, Gk(x) \qquad \text{Equation (7)}$$

is obtained. $x_k$ is guaranteed to converge to a global minimum of F(x).

A solution for $x_k$, can then be obtained using Equation 8, shown below.

$$x_k = \left(I + \frac{\lambda_1}{2}D^T \Delta_k D + \frac{\lambda_2}{2}(D^2)^T \nabla_k (D^2)\right)^{-1} y \qquad \text{(Equation 8)}$$

Further manipulation of Equation (8), such as manipulation of the multiplicative inverse term multiplying y to obtain $x_k$, may be used to improve the numerical stability of the matrix inverse in embodiments where:

$$\Delta_k = \text{diag}(|Dx_{k-1}|) \text{ and } \nabla_k = \text{diag}(|D^2 x_{k-1}|) \qquad \text{(Equation 9)}$$

and where diag(z) denotes a diagonal matrix whose diagonal elements consists of the vector z.

The steps of obtaining an iterative solution of the optimization of Equation (4), in accordance with embodiments of the present disclosure, are as follows:
1) Set k=1
2) Initialize $x_1$=y (other initialization values for $x_1$ may be used)
3) For k=2 until convergence
   a. Evaluate $\Delta_k$ (Equation 9)
   b. Evaluate $\nabla_k$ (Equation 9)
   c. Evaluate $x_k$ (Equation 8)
   d. Evaluate convergence criteria
4) Obtain $\hat{x}$ as an estimate of x It should be noted that, in Step 3d, one can setup a tolerance that evaluates the successive difference of the solution obtained in the current loop $x_k$ relative to the previous loop $x_{k-1}$ relative to a norm, such as the L2 norm. Alternatively, one can choose a number of iterations $N_{loop}$ based to run the iterative optimization solution and obtain $N_{loop}$ through cross-validation tests. Yet another method is to evaluate the difference of successive $F(x_k)$ values relative to a norm, such as the L2 norm and stop the number of iterations at a desired tolerance threshold. Still other methods to evaluate the convergence to the unique solution would be known to those knowledgeable in the relevant arts.

Finally, when $\hat{x}$ is obtained, it is used as an input to a feature detector, in embodiments the cyclostationarity detector described below.

Figure 5:
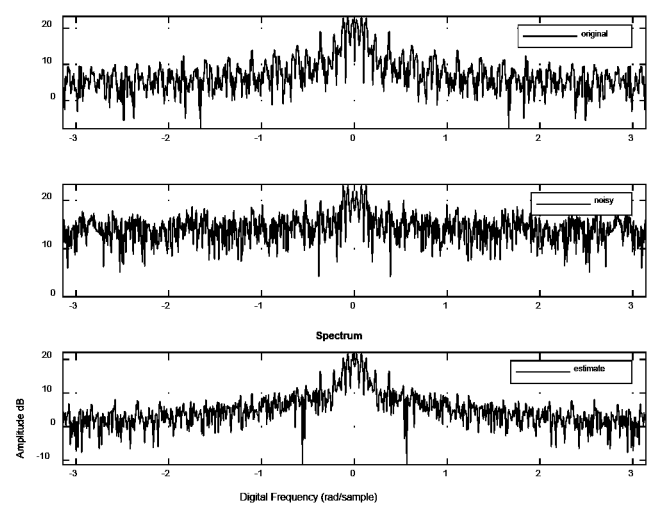
FIG. 5 shows the spectra of the true, noisy and denoised signal of FIG. 4.

Now, as an experiment, take the waveform shown in FIG. 4, which has two different periods (the "original" signal trace), and induce AWGN noise such that the SNR is 0 dB (the "noisy" signal trace). Finally, use TVD to recover the original signal (the "estimate" signal trace). Similarly, the spectrum of the TVD output clearly shows that the signal is estimated throughout all frequencies. Notably, linear filtering would not preserve the information at all frequencies and would smear the pulses and consequently degrade the estimation of the periodicity of the pulse. An important point to note about this optimization technique is that the only assumption that was made was that the signal is sparse in its derivative. Spectrums corresponding to the original, noisy, and estimated data are provided in FIG. 5.

These teachings, while generally applicable, are particularly useful in the context of intercepting Low Probability of Intercept (LPI) waveforms. This is because such techniques allow the waveform characteristics (e.g. period) to be determined over a shorter interval of time at lower SNR ratios.

Figure 6:
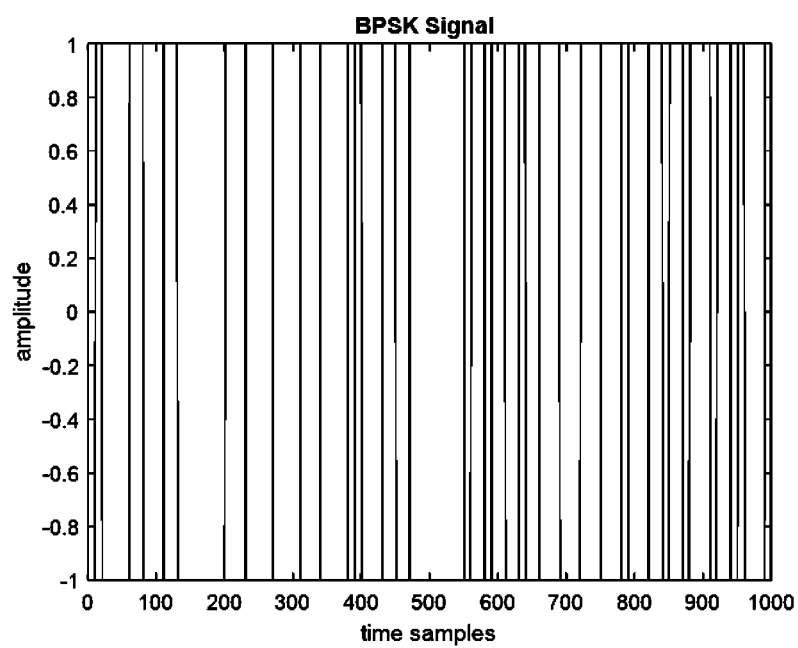
FIG. 6 is an example of a binary phase shift keying (BPSK) signal.
Figure 7:
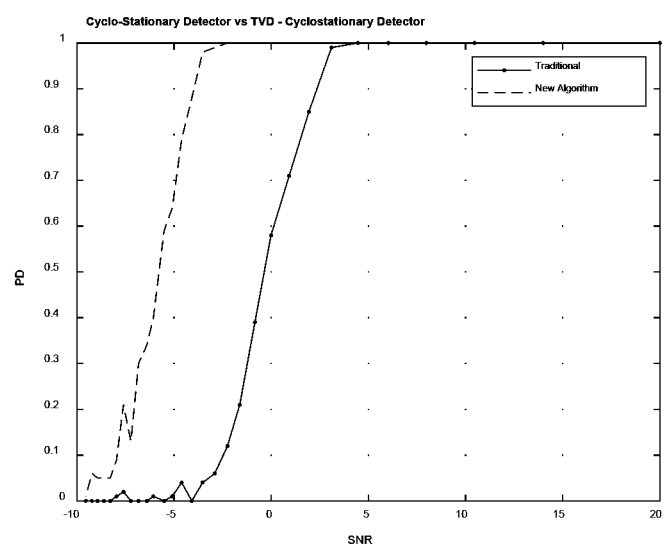
FIG. 7 shows receiver operation characteristic performance of the methods and apparatuses taught herein compared with traditional Cyclostationarity Detection (CSD) techniques, illustrating their relative probability of detection of the periodicity of the signal.

Now referring to FIGS. 6 and 7, a numerical example of a Binary Phase-Shift Keying (BPSK) waveform with 100 Hz (for illustration purposes) and sampling rate of 1000 Hz is used to further illustrate this concept. More specifically, FIG. 6 shows the actual signal and FIG. 7 shows the performance of the two detectors in detecting the signal periodicity correctly at different SNRs. Notably, in FIG. 7, the maximum value was chosen as the correct period, which allows for the same false alarm for both detectors. From this example, it is clear the TVD non-linear filter improves upon the traditional CSD detector by a margin of 6 dB.

Now regarding GTVD combined with CSD and simulation, simulations of the joint detection algorithm were performed to model the effectiveness of using TVD as a pre-process to CSD. The following parameters were used as simulation input parameters:
Input file
    4800 bps BPSK waveform
    Stepped through algorithm from −5 dB to 10 dB Es/No in increments of 1 dB
100 trials computed for each increment
In each iteration, four sets detection metrics were produced
    Cylostationarity Detection for Noise Only
    Cylostationarity Detection for BPSK Signal
    TVD Algorithm followed by Cylostationarity Detection for Noise Only
    TVD Algorithm followed by Cylostationarity Detection for BPSK Signal The output of the simulation captured the statistical metrics used as a basis for detection. This result was captured by running the CSD algorithm against a period of time when the input BPSK signal was present and an identical period of time where the signal was not present (Noise Only).

Extraction of the peak values, locations, and statistics provides information to determine the presence of a periodic waveform. To characterize the results, in embodiments, several iterations are performed, such that a set of Receiver Operating Characteristics (ROC) curves can be generated.

Figure 8:
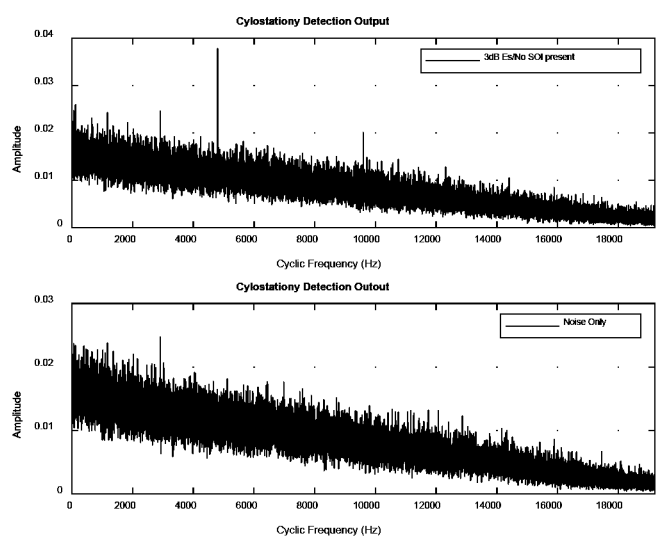
FIG. 8 shows a single output frame from the CSD with and without the signal present.
Figure 9:
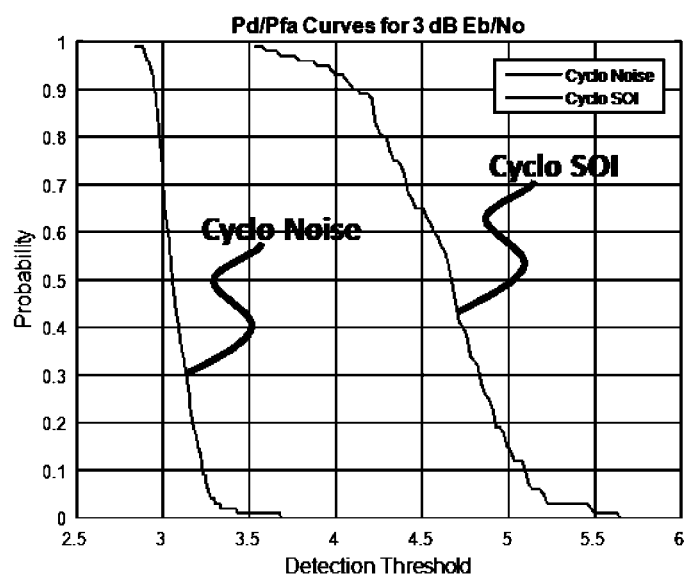
FIG. 9 shows Pd/Pfa results for a specific signal-to-noise ratio.

A typical set of detection metrics from the CSD is shown in FIGS. 8 and 9. More specifically, FIG. 8 shows a single output frame from the CSD with and without the signal present. FIG. 9 shows the $P_d/P_{fa}$ (Probability of Detection and Probability of False Alarm, respectively) results from the aggregate metrics after a complete set of iterations. A good detection algorithm will have a high degree of separation between the curves, such that a detection threshold can be selected that provides high $P_d$ and low $P_{fa}$.

Figure 10:
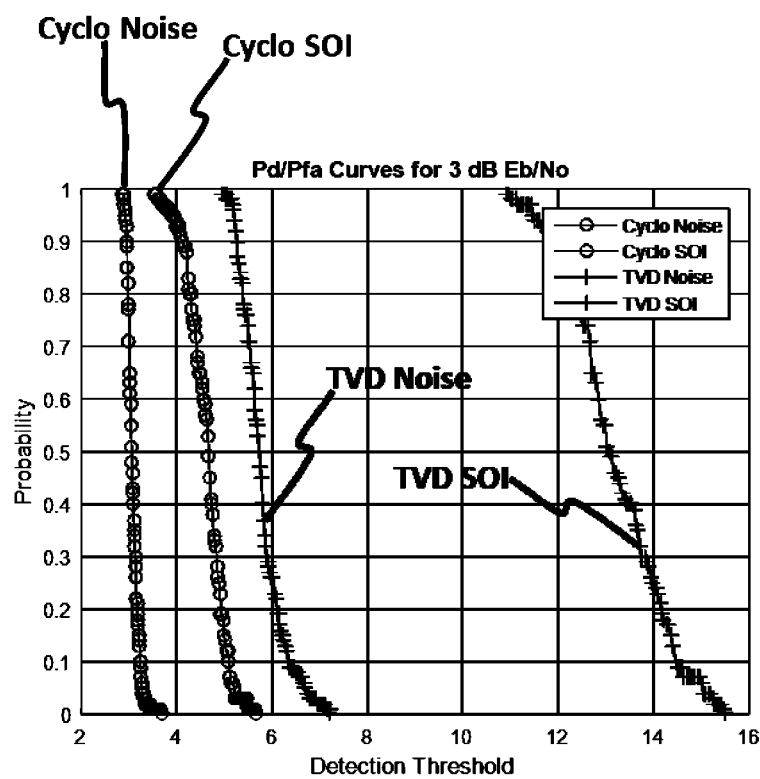
FIG. 10 is a Pd/Pfa curve comparing detection threshold separation for cylostationary detection techniques, GTVD, and embodiments of the present disclosure for a 1 dB Es/No (mean symbol energy (Es) to Noise (No) ratio) BPSK signal.

To evaluate the effectiveness of the TVD algorithm, the CSD was run for all iterations, alongside the joint TVD and CSD algorithms. FIG. 10 shows the results from the 3 dB Es/No BPSK waveform. At this power level, the CSD alone begins to fail due to the fact that there is no acceptable Detection Threshold (DT) that provides a suitable probability of detection, for example 0.95, while keeping the probability of a false alarm minimized. The curves generated using the TVD algorithm prior to CSD, however, provide enough separation to select a threshold that will meet a typical $P_d/P_{fa}$ requirement. Furthermore, for the same detection performance, the incidence of false alarm is shown to be less when using the techniques and apparatuses disclosed herein.

Figure 11:
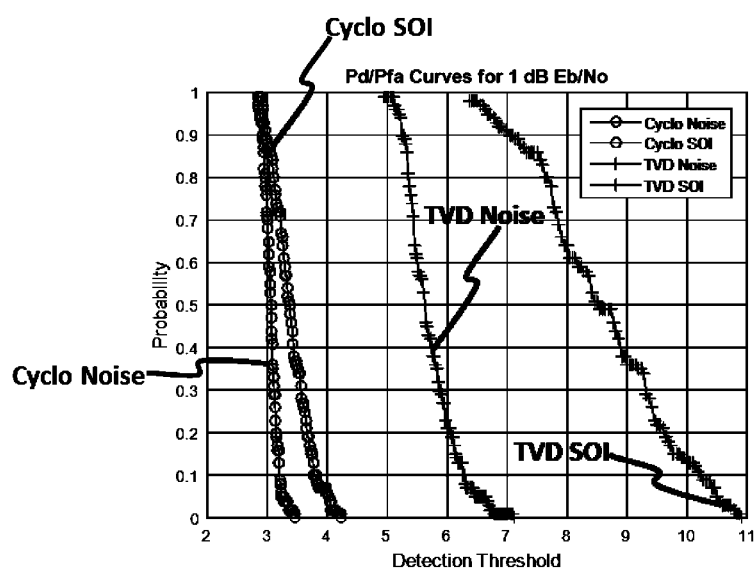
FIG. 11 is a Pd/Pf curve which compares the detection threshold separation for cylostationary detection techniques, GTVD techniques, and other techniques disclosed herein for a 1 dB Es/No BPSK signal.

FIG. 11 shows an analysis for trials at 1 dB Es/No. At this point, the separation between the curves for the TVD algorithm is beginning to overlap, making it difficult to find a suitable $P_d/P_{fa}$ detection threshold. Based on this analysis, a 2 dB improvement is obtained when using the TVD algorithm prior to CSD.

FIG. 12 provides a table that shows results from simulations at various Es/No. Note that the highlighted distances indicate a margin greater than 1. This indicates a usable detection threshold to obtain a $P_d$>0.99 while limiting $P_{fa}$<0.05.

Detection metrics used in this model are the maximum value above mean. There are many other methods that can be employed to generate detection metrics, as would be known to one of ordinary skill in the art. Two examples would be to use the number of standard deviations above the mean or to use the max value above an adaptive threshold.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A feature detection system, the system comprising:
   at least one processor in operative communication with a signal source, said processor further comprising at least one non-transitory storage medium, wherein the at least one non-transitory storage medium contains instructions configured to cause the processor to:
   apply a generalized total variation denoising approach to a signal received from said signal source;
   perform a cyclostationarity detection on the signal after the generalized total variation denoising approach has been applied thereto; and
   output statistics regarding the signal.

2. The system of claim 1, wherein the signal source is a receiver configured to receive electromagnetic radiation.

3. The system of claim 1, wherein said statistics regarding the signal are selected from the group consisting of peak values, locations of peaks and troughs, periodicity or lack thereof, aperiodicity, spectral signature, and peak values at different periodicities.

4. The system of claim 1, wherein the generalized total variation denoising approach comprises a minimization of a cost function.

5. The system of claim 4, wherein the cost function comprises a data fidelity term and a regularization function.

6. The system of claim 5, wherein the regularization function is selected from the group consisting of $l_1$ norm or $l_0$ norm, nuclear norm, sparsity promoting functions, non-convex penalties, group sparse functions, total variation, mixed norms, Huber loss functions, sparsity in a transform domain, sparsity using prior knowledge, and structure in time-frequency transforms.

7. The system of claim 4 wherein the cost function is formulated from a Bayesian estimation theory perspective and estimates the signal in the absence of noise.

8. The system of claim 7 wherein the signal in the absence of noise is estimated using a maximum a posteriori estimate.

9. The system of claim 1 wherein the generalized total variation denoising of a one-dimensional signal, x, corrupted by additive white Gaussian noise, n, to give y=n+x is defined by the following optimization problem:

$$GTVD_{\lambda,N}\{y\} = \underset{x}{\operatorname{argmin}}\left\{\frac{1}{2}\|(y-x)\|_2^2 + \sum_{i=0}^{N}\lambda_i\varphi_i(D_i^{\alpha_i}x_i)\right\}$$

where:
φ are regularization functions;
$\alpha_i$ are integers that may also be defined as fractions;
$D_i$ are operators; and
$\lambda_i$ are regularization parameters.

10. The system of claim 9 wherein said operators are linear filters in matrix form, forming a difference matrix.

11. The system of claim 10 wherein rows of the difference matrix are written as a filter.

12. The system of claim 11 wherein said filter is a notch filter.

13. The system of claim 11 wherein said filter is selected from the group consisting of high pass filters, low pass filters, and band pass filters.

14. The system of claim 10 wherein the generalized total variation denoising function comprises two parts, a first part being a least square data-fidelity term and a second part being a penalty function that penalizes the total variation of the signal.

15. The system of claim 1 wherein said statistics regarding the signal comprise statistics relevant to detection and classification of a waveform.

16. The system of claim 1 wherein said statistics regarding the signal comprise an identification of a transmitter.

17. A method of feature detection of a signal,
   the method comprising:
   receiving a signal;
   applying a generalized total variation denoising function to the signal;
   performing cyclostationarity detection on the signal after the generalized total variation denoising approach has been applied thereto; and
   outputting statistics regarding the signal,
   wherein the generalized total variation denoising function comprises two parts, a first part being a least square data-fidelity term and a second part being a penalty function that penalizes the total variation of the signal,
   wherein the generalized total variation denoising approach further comprises minimization of a cost function, and
   wherein the cost function comprises a data fidelity term and a regularization function.

18. The method of claim 17 wherein the generalized total variation denoising of a one-dimensional signal, x, corrupted by additive white Gaussian noise, n, to give y=n+x is defined by the following optimization problem:

$$GTVD_{\lambda,N}\{y\} = \operatorname*{argmin}_{x}\left\{\frac{1}{2}\|(y-x)\|_2^2 + \sum_{i=0}^{N}\lambda_i\varphi_i(D_i^{\alpha_i}x_i)\right\}$$

where:
$\varphi$ are regularization functions;
$\alpha_i$ are integers that may also be defined as fractions;
$D_i$ are operators; and
$\lambda_i$ are regularization parameters.

19. A feature detection apparatus, the apparatus comprising:
a receiver configured to receive electromagnetic radiation;
at least one processor in operative communication with said receiver, said processor further comprising at least one non-transitory storage medium, wherein the at least one non-transitory storage medium contains instructions configured to cause the processor to:
apply a generalized total variation denoising approach to a signal received from said receiver;
perform cyclostationarity detection on the signal after the generalized total variation denoising approach has been applied thereto; and
output features regarding the signal, wherein said features allow for detection and classification of the signal characteristics,
wherein the generalized total variation denoising approach comprises two parts, a first part being a least square data-fidelity term and a second part being a penalty function that penalizes the first or/and higher order total variation denoising of the signal,
wherein the generalized total variation denoising approach comprises minimization of a cost function,
wherein the cost function comprises a data fidelity term and a regularization function.

20. The apparatus of claim 19 wherein the generalized total variation denoising of a one-dimensional signal, x, corrupted by additive white Gaussian noise, n, to give y=n+x is defined by the following optimization problem:

$$GTVD_{\lambda,N}\{y\} = \operatorname*{argmin}_{x}\left\{\frac{1}{2}\|(y-x)\|_2^2 + \sum_{i=0}^{N}\lambda_i\varphi_i(D_i^{\alpha_i}x_i)\right\}$$

where:
$\varphi$ are regularization functions;
$\alpha_i$ are integers that may also be defined as fractions;
$D_i$ are operators; and
$\lambda_i$ are regularization parameters.

* * * * *